United States Patent
Lu et al.

(10) Patent No.: US 11,866,367 B2
(45) Date of Patent: Jan. 9, 2024

(54) OIL WELL CEMENT COMPOSITE PERMEATION ENHANCEMENT AGENT SUITABLE FOR HYDRATE LAYER AND PREPARATION METHOD

(71) Applicant: CHINA UNIVERSITY OF PETROLEUM (EAST CHINA), Qingdao (CN)

(72) Inventors: Chang Lu, Qingdao (CN); Huajie Liu, Qingdao (CN); Shenglai Guo, Qingdao (CN); Yuhuan Bu, Qingdao (CN); Changyou Xiang, Qingdao (CN); Qiang Wang, Qingdao (CN); Xinyang Guo, Qingdao (CN)

(73) Assignee: CHINA UNIVERSITY OF PETROLEUM (EAST CHINA), Qingdao (CN)

( * ) Notice: Subject to any disclaimer, the term of this patent is extended or adjusted under 35 U.S.C. 154(b) by 0 days.

(21) Appl. No.: 18/109,859

(22) Filed: Feb. 15, 2023

(65) Prior Publication Data
US 2023/0357080 A1 Nov. 9, 2023

(30) Foreign Application Priority Data
May 7, 2022 (CN) .......................... 202210490142.5

(51) Int. Cl.
*C09K 8/02* (2006.01)
*C04B 16/06* (2006.01)
*C04B 16/08* (2006.01)
*C04B 40/00* (2006.01)
*C04B 111/00* (2006.01)

(52) U.S. Cl.
CPC ........ *C04B 16/0633* (2013.01); *C04B 16/085* (2013.01); *C04B 40/0039* (2013.01); *C04B 2111/00284* (2013.01)

(58) Field of Classification Search
CPC ....................................................... C09K 8/02
USPC ........................................................ 523/130
See application file for complete search history.

(56) References Cited

U.S. PATENT DOCUMENTS

2006/0078729 A1* 4/2006 Yabuki .................... E04C 5/073
428/364
2013/0112414 A1* 5/2013 Kumar ...................... E21B 7/00
166/300

FOREIGN PATENT DOCUMENTS

CN 108410442 A 8/2018

OTHER PUBLICATIONS

GB/T 19139-2003, Procedure for testing well cements, China National Standards, 2003, pp. 1-86, 108, 121-140, General Administration of Quality Supervision, Inspection and Quarantine of the People Republic of China.

* cited by examiner

*Primary Examiner* — Deve V Hall
(74) *Attorney, Agent, or Firm* — Bayramoglu Law Offices LLC

(57) ABSTRACT

An oil well cement composite permeation enhancement agent suitable for a hydrate layer and a preparation method thereof are disclosed. In parts by weight, the composition of raw materials of the composite permeation enhancement agent is 4.6 parts-5.0 parts of kerosene, 0.23 parts-0.25 parts of emulsifier, 0.8 parts-1.1 parts of modified polypropylene fiber, 10.0 parts-12.0 parts of porous and permeable microspheres, 1.0 part-1.2 parts of paraffin, and 57.5 parts-62.5 parts of water. The composite permeation enhancement agent can effectively improve the permeability of the cement stone which reshapes the formation framework and increase the mining rate of hydrate. The oil well cement composite permeation enhancement agent has the advantages of long-term performance, low cost, and green environmental protection. The composite permeation enhancement agent of the present invention does not need secondary treatment to increase permeation, the operation is convenient and fast, and the working time of holding pressure is reduced.

7 Claims, No Drawings

OIL WELL CEMENT COMPOSITE PERMEATION ENHANCEMENT AGENT SUITABLE FOR HYDRATE LAYER AND PREPARATION METHOD

This application is based upon and claims priority to Chinese Patent Application No. 202210490142.5, filed on May 7, 2022, the entire contents of which are incorporated herein by reference.

TECHNICAL FIELD

The present invention belongs to the technical field of oil and gas well cementing, particularly an oil well cement composite permeation enhancement agent suitable for a hydrate layer and a preparation method thereof.

BACKGROUND

Currently, commercial mining of natural gas hydrate reservoirs is not going smoothly, and several trial production efforts in Canada, the United States, and Japan were finally suspended due to a large amount of sand production. The large amount of sand produced in the process of hydrate mining is the result of how hydrate binds with the sandstone particles and is a part of the formation framework particles. When the step-down mining method is adopted to break the temperature and pressure condition of the hydrate to decompose the hydrate into natural gas and water, the porosity of the decomposed formation increases, and the strength decreases. The stability of the formation in the near-well decomposition area worsens, leading to serious sand production in the mining process. When the sediment particles in the formation are uncontrolled from the wellbore, it will not only block the gas production channel and then reduce or even stop the production of the oil well, but also cause the sand in the formation to enter the wellbore lifting equipment, make drilling equipment wear out and increase the production cost. When the amount of sand production is too large, it will also cause sidewall instability, submarine landslides, ground collapse, methane leakage, and even adverse effects on the atmospheric environment.

Grouting is an in-layer reinforcement method that can effectively support the formation at present. The fracture network is formed in the reservoir with low effective permeability through hydraulic fracturing technology, and then the curable curing fluid is injected into the reservoir through the wellhead. Thus, the cement slurry will pass through the fracture network to the depth of the reservoir. In this way, the formation can be strengthened, and the stability of the formation increases, thereby preventing the formation from collapsing due to hydrate mining. However, the average formation permeability is only $6.8 \times 10^{-3}$ $\mu m^2$. Due to the low initial effective permeability of the hydrate reservoir, the mining rate of hydrate in the early stage is decreased, which prolongs the mining time and increases the production cost. At the same time, the lower permeability of cement stone will seal the formation pores and micro-fractures in reshaping the formation framework, reduce the flow channel of natural gas, and further reduce the mining rate of natural gas hydrate. Therefore, it is necessary to develop an oil well cement compound permeation enhancement agent suitable for a hydrate layer to increase the permeability of the cement stone and provide more flow channels for gas hydrate mining.

There are few experimentations and research on the oil well cement permeation enhancement agent in China. The permeation enhancement methods increase the pore spaces inside the cement stone, which will cause great damage to the strength of the cement stone. Overall, the permeation enhancement effect under a low-temperature environment has not been shown. However, a part of the permeation enhancement agents needs to be dissolved by crude oil or through a high temperature to expand the pore spaces of the cement stone, which is not feasible for mining natural gas hydrate. Therefore, it is necessary to develop an oil well cement composite permeation enhancement agent suitable for a hydrate layer, which has less of an impact on the strength of the cement stone.

SUMMARY

Given the above problems, the subject of the present invention is to provide an oil well cement composite permeation enhancement agent suitable for a hydrate layer and a preparation method thereof. The composite permeation enhancement agent can effectively improve the permeability of the cement stone of the reshaped formation framework and increase the mining rate of hydrate.

In order to achieve the above subject, the present invention provides an oil well cement composite permeation enhancement agent suitable for a hydrate layer. In parts by weight, the composition of raw materials of the composite permeation enhancement agent is 4.6 parts-5.0 parts of kerosene, 0.23 parts-0.25 parts of emulsifier, 0.8 parts-1.1 parts of modified polypropylene fiber, 10.0 parts-12.0 parts of porous and permeable microspheres, 1.0 part-1.2 parts of paraffin, and 57.5 parts-62.5 parts of water.

In the composite permeation enhancement agent described above, preferably, the kerosene is a colorless and transparent pure kerosene. The emulsifier is an emulsifier of Tween 80 (T80). The length of the modified polypropylene fiber is 5 mm-6 mm, where too short fiber will reduce the efficiency of the communication of the pore spaces, and too long fiber will cause the fiber cannot to be dispersed effectively in the cement slurry. The porous and permeable microspheres are a high-strength porous medium microspheres made in the laboratory, where the diameter of each of the microspheres is 30 mesh-50 mesh, namely 0.27 mm-0.55 mm, and the aperture is 0.15 mm-0.25 mm. The paraffin is a solid paraffin of C18-30.

In the oil well cement composite permeation enhancement agent provided by the present invention, the function of the kerosene and the emulsifier of T80 in the composition is to add into the water to form an oil-in-water emulsion, where a plurality of oil beads with small particle sizes that do not participate in the hydration reaction is evenly distributed in the cement stone, thus increasing the pore spaces of the cement stone. The function of the paraffin is to temporarily seal the hollows of the porous and permeable microspheres before cement slurry solidification and then dissolved by the kerosene after solidification to open the hollows of the microspheres. On the one hand, the function of the porous and permeable microspheres is further to increase the pore spaces of the cement stone; on the other hand, the self-high strength of the microspheres can support fractures of the formation and prevent the curing fluid from being extruded and back discharged before hardening. The primary function of polypropylene fiber is to communicate a plurality of independent pore spaces to improve the permeability of the cement stone.

A preparation method of the oil well cement composite permeation enhancement agent suitable for the hydrate layer provided by the present invention is as follows:

(1) Mixing the distilled water with the emulsifier and stirring well, then adding with the kerosene and stirring at high speed for 10 min to obtain an emulsion.

(2) Heating the paraffin to be a liquid and immersing the porous and permeable microspheres into the liquid paraffin, followed by placing the resulting microspheres in an open container. Placing the open container in a vacuum chamber, conducting a vacuum for 60 min under a pressure of −0.1 MPa, where the temperature of the vacuum chamber is higher than the melting point of the paraffin. Then, moving the resulting microspheres from the vacuum chamber to 4° C. and refrigerated until the paraffin became solid. The paraffin is stored in the center of the hollow microspheres in a solid form, and paraffin-bearing microspheres were obtained.

(3) Adding the surface-modified polypropylene fiber into the emulsion and adding the paraffin-bearing microspheres while stirring to obtain the composite permeation enhancement agent.

The mass fraction of the kerosene in the emulsion is 8%.

The specific preparation process of the surface-modified polypropylene fiber is as follows: first, swelling the polypropylene fiber with xylene for 60 min-80 min, then taking it out and filtering to dry. Soaking the resulting fiber in acetone solution for 3 h-4 h, then washing with distilled water and drying in the air. Followed by soaking the resulting fiber with a silane coupling agent with a concentration of 50% for 120 min to modify and optimize the surface of the polypropylene fiber. After the modification is completed, washing the resulting fiber to be neutral with distilled water and drying to obtain a surface-modified polypropylene fiber. Finally, blowing the surface-modified polypropylene fiber into a root shape with an air gun and packing for set aside, where the temperature of the swelling is 80° C.-90° C.

The specific preparation process of the porous and permeable microspheres is as follows: weighing an appropriate amount of water, dissolving sodium hydroxide, sodium silicate, and sodium chloride in the water at a mass percentage of 12%-20%: 40%-60%: 30%-50%. Followed by adding metakaolin 1 time-1.5 times the mass of water into the resulting mixture, stirring and mixing evenly to form a slurry. Slowly and evenly adding the slurry into the oil phase, stirring, and dispersing the resulting mixture into the balls. After the stirring, filtering the resulting balls to get geopolymer microspheres. Then washing the microspheres and conducting a high-temperature calcination to obtain high-strength porous and permeable microspheres. Where the oil phase is corn oil, soybean oil, peanut oil, kerosene, castor oil, or rapeseed oil. Slurry B accounts for 5%-50% of the volume of the dispersion medium of the oil phase. The temperature of the high-temperature calcination is 800° C.-1500° C., and the calcination time is 1 h-8 h.

The present invention can make the permeability of the oil well cement reach $9.06 \times 10^{-3}$ $\mu m^2$ after maintaining the oil well cement for 24 h under the closed condition of 12 MPa, which exceeds the average permeability of hydrate reservoir by more than 20%. At the same time, the early strength of the oil well cement reaches 6.36 MPa, which can be used for the consolidation of loose formation.

In addition, the oil well cement composite permeation enhancement agent has the following advantages:

1. The high-strength porous and permeable microspheres in the composition of the composite permeation enhancement agent of the present invention can be used as a supporting agent to support the fracture, prevent the curing fluid from being extruded, and back discharged before hardening, and reduce the working time of holding pressure.
2. The composite permeation enhancement agent of the present invention does not need secondary treatment to increase permeation, the operation is convenient and fast, and the operation time will not be increased.
3. The composite permeation enhancement agent of the present invention does not contain toxic chemical additives, which is green and environmentally friendly, and some compositions can be pre-treated and preserved for a long time.
4. The composite permeation enhancement agent provided by the present invention is suitable for grade G cement and ultrafine oil well cement and can be used together with lightweight agents such as hollow glass beads, floating beads, etc., to prepare cement slurry that meets different density requirements and has no special requirements for water quality.

DETAILED DESCRIPTION OF THE EMBODIMENTS

Firstly, the performance of oil-in-water emulsion made of kerosene was compared to other emulsions and then the performance of porous and permeable microspheres with different mesh sizes was compared. Then, surface-modified polypropylene fibers of different lengths were added to test the communication effect of pore space. Finally, the three comparisons were combined to test the permeability-enhancing effect of the composite permeation enhancement agent with different proportions. Combined with the influence test of early intensity, the best proportion of the three is selected.

Embodiment 1

Kerosene and the emulsifier of T80 were mixed at a mass ratio of 10:1, and then water with 25 times the mass of the kerosene was added into the mixture and stirred at high speed to prepare an oil-in-water emulsion with a mass fraction of 4% (calculated according to the mass of kerosene/water, the same as below), which was recorded as MY-1.

With the amount of water and the emulsifier unchanged, it increased the amount of the kerosene to a ratio of 15:1 with the emulsifier to prepare an oil-in-water emulsion with a mass fraction of 6%, which was recorded as MY-2.

With the amount of the water and the emulsifier unchanged, it increased the amount of kerosene to a ratio of 20:1 with the emulsifier to prepare an oil-in-water emulsion with a mass fraction of 8%, which was recorded as MY-3.

The kerosene in the above three emulsions was replaced with liquid paraffin of equal quality to prepare emulsions recorded as SL-1, SL-2, and SL-3 respectively. The kerosene in the above three emulsions was replaced with vegetable oil of equal quality to prepare emulsions recorded as ZW-1, ZW-2, and ZW-3, respectively.

Embodiment 2

The high-strength porous and permeable microspheres with different mesh sizes (30 mesh-50 mesh, 50 mesh-80 mesh, 80 mesh-100 mesh) with 0.1 times the mass of cement were weighed and recorded as WQ-1, WQ-2, and WQ-3, respectively.

Embodiment 3

The surface-modified polypropylene fibers of different lengths (3 mm, 5 mm-6 mm, 10 mm) with 0.01 times the mass of cement were weighed and recorded as XW-1, XW-2, and XW-3, respectively.

Embodiment 4

The preferred porous and permeable microspheres (10 parts) of appropriate size were filled with paraffin (1.0 part), the surface-modified polypropylene fiber (1.5 parts), and the emulsion with a mass fraction of 4% (2.4 parts of kerosene, 0.24 parts of emulsifier, 60 parts of water). They were weighed and packed to obtain the composite permeation enhancement agent, which was recorded as ZS-1.

Embodiment 5

The preferred porous and permeable microspheres (10 parts) of appropriate size were filled with paraffin (1.0 part), the surface-modified polypropylene fiber (1.5 parts), and the emulsion with a mass fraction of 6% (3.6 parts of kerosene, 0.24 parts of emulsifier, 60 parts of water). They were weighed and packed to obtain the composite permeation enhancement agent, which was recorded as ZS-2.

Embodiment 6

The preferred porous and permeable microspheres (10 parts) of appropriate size were filled with paraffin (1.0 part), the surface-modified polypropylene fiber (0.8 parts), and the emulsion with a mass fraction of 8% (4.6 parts of kerosene, 0.23 parts of emulsifier, 57.5 parts of water). They were weighed and packed to obtain the composite permeation enhancement agent, which was recorded as ZS-3.

Embodiment 7

The preferred porous and permeable microspheres (12 parts) of appropriate size were filled with paraffin (1.1 parts), the surface-modified polypropylene fiber (1.0 part), and the emulsion with a mass fraction of 8% (5.0 parts of kerosene, 0.24 parts of emulsifier, 62.5 parts of water). They were weighed and packed to obtain the composite permeation enhancement agent, which was recorded as ZS-4.

Embodiment 8

The preferred porous and permeable microspheres (11 parts) of appropriate size were filled with paraffin (1.2 parts), the surface-modified polypropylene fiber (1.1 parts), and the emulsion with a mass fraction of 8% (4.8 parts of kerosene, 0.25 parts of emulsifier, 60 parts of water). They were weighed and packed to obtain the composite permeation enhancement agent, which was recorded as ZS-5.

Test Example 1

The emulsions of MY-1, MY-2, MY-3, SL-1, SL-2, SL-3, ZW-1, ZW-2, and ZW-3 in Embodiment 1 were prepared and the ultrafine cement at a water-cement ratio of 0.6 was added to prepare the cement slurries according to the standard of GB/T 19139-2003. The cement slurries were maintained under the closed condition of 15° C., 12 MPa, and the influence of the addition of the three emulsions on the early strength and permeability of cement stone were tested. The test results are shown in Table 1:

TABLE 1

Influence of the addition of different oil-in-water emulsions on the early strength and permeability of the cement stone

| formula | early strength/MPa | permeability/$\mu m^2$ |
| --- | --- | --- |
| cement + distilled water | 15.92 | $3.14 \times 10^{-3}$ |
| cement + MY-1 | 11.13 | $6.54 \times 10^{-3}$ |
| cement + MY-2 | 8.33 | $8.41 \times 10^{-3}$ |
| cement + MY-3 | 7.14 | $11.40 \times 10^{-3}$ |
| cement + SL-1 | 11.43 | $4.6 \times 10^{-3}$ |
| cement + SL-2 | 9.63 | $4.71 \times 10^{-3}$ |
| cement + SL-3 | 8.31 | $5.13 \times 10^{-3}$ |
| cement + ZW-1 | 7.48 | $4.78 \times 10^{-3}$ |
| cement + ZW-2 | 5.56 | $5.35 \times 10^{-3}$ |
| cement + ZW-3 | 3.08 | $5.89 \times 10^{-3}$ |

It is shown in the above table that, with the increase of mass fraction, oil-in-water emulsion made of kerosene has a better permeation enhancement effect than other emulsions, and the influence on the early strength of the cement stone is within an acceptable range. Considering the two aspects of the early strength and the permeability, kerosene is selected to prepare the oil-in-water emulsion and MY-3 is selected as the composition of the composite permeation enhancement agent.

Test Example 2

The WQ-1, WQ-2, and WQ-3 porous and permeable microspheres with 0.1 times the mass of cement in Embodiment 2 were prepared and added into the ultrafine cement to prepare cement slurries according to the standard of GB/T 19139-2003, where the water-cement ratio was 0.6. The cement slurries were maintained under the closed condition of 15° C., 12 MPa, and the influence of the addition of the three porous and permeable microspheres with different particle sizes on the early strength and permeability of the cement stone were tested. The test results are shown in Table 2:

TABLE 2

Influence of the addition of porous and permeable microspheres with different particle sizes on the early strength and permeability of the cement stone

| formula | early strength/MPa | permeability/$\mu m^2$ |
| --- | --- | --- |
| base slurry | 15.92 | $3.14 \times 10^{-3}$ |
| base slurry + WQ-1 | 7.58 | $5.87 \times 10^{-3}$ |
| base slurry + WQ-2 | 7.12 | $6.19 \times 10^{-3}$ |
| base slurry + WQ-3 | 8.01 | $6.63 \times 10^{-3}$ |

It can be seen from the test above that although paraffin has not been used to seal, the permeable microspheres can still provide a certain pore space for the cement stone and improve its permeability. It is speculated that part of the pore space is a fracture between the microspheres. The addition of the three porous and permeable microspheres with the same mass have a certain influence on the strength of the cement stone. As the particle size is smaller, the early strength and permeability of the cement stone are improved, but the difference is not big. Considering that the production of the microspheres with the particle size of 30 mesh to 50 mesh is the highest, it is reasonable to choose porous microspheres with the particle size of 30 mesh to 50 mesh as the composition of the composite permeation enhancement agent.

Test Example 3

The XW-1, XW-2, and XW-3 fiber with 0.01 times the mass of cement in Embodiment 3 were prepared and added together with MY-1 into the ultrafine cement to prepare cement slurry according to the standard of GB/T 19139-2003, where the water-cement ratio was 0.6. The cement slurries were maintained under the closed condition of 15° C., 12 MPa, and the influence of the addition of the three polypropylene fibers on the early strength and permeability of the cement stone were tested. The test results are shown in Table 3:

TABLE 3

Influence of polypropylene fibers of different lengths on the early strength and permeability of the cement stone

| formula | early strength/MPa | permeability/$\mu m^2$ |
| --- | --- | --- |
| base slurry + MY-1 | 11.13 | $6.54 \times 10^{-3}$ |
| base slurry + MY-1 + XW-1 | 6.09 | $5.76 \times 10^{-3}$ |
| base slurry + MY-1 + XW-2 | 6.38 | $7.85 \times 10^{-3}$ |
| base slurry + MY-1 + XW-3 | 5.89 | $9.02 \times 10^{-3}$ |

The results above show that the increased the fiber length, the higher the permeability of the cement stone, indicating that the longer the fiber, the more pore space inside the cement stone is communicated with each other. However, the 10 mm fiber is still easy to aggregate in the cement slurry after the surface modification, which is not conducive to grouting. Therefore, the polypropylene fiber with a length of 5 mm-6 mm is selected as the composition of the composite permeation enhancement agent.

Test Example 4

The permeation enhancement performances of the composite permeation enhancement agent ZS-1 of Embodiment 4, the composite permeation enhancement agent ZS-2 of Embodiment 5, the composite permeation enhancement agent ZS-3 of Embodiment 6, the composite permeation enhancement agent ZS-4 of Embodiment 7, and the composite permeation enhancement agent ZS-5 of Embodiment 8 were tested. The weighted composite permeation enhancement agents were added to the ultrafine cement to prepare the cement slurry according to the standard of GB/T 19139-2003, where the water-cement ratio was 0.6. The cement slurries were maintained under the closed condition of 15° C., 12 MPa, and the influence of the addition of the five composite permeation enhancement agents on the early strength and permeability of the cement stone were tested. The test results are shown in Table 4:

TABLE 4

Influence of composite permeation enhancement agents on the early strength and permeability of the cement stone

| formula | early strength/MPa | permeability/$\mu m^2$ |
| --- | --- | --- |
| base slurry + ZS-1 | 7.54 | $7.05 \times 10^{-3}$ |
| base slurry + ZS-2 | 6.51 | $7.40 \times 10^{-3}$ |
| base slurry + ZS-3 | 6.36 | $9.06 \times 10^{-3}$ |

TABLE 4-continued

Influence of composite permeation enhancement agents on the early strength and permeability of the cement stone

| formula | early strength/MPa | permeability/$\mu m^2$ |
| --- | --- | --- |
| base slurry + ZS-4 | 6.14 | $8.87 \times 10^{-3}$ |
| base slurry + ZS-5 | 6.28 | $8.94 \times 10^{-3}$ |

The results above display that the composite permeation enhancement agents of ZS-3, ZS-4, and ZS-5 have better permeability than ZS-1 and ZS-2, and the cement stone permeability exceeds the average permeability of the hydrate reservoir by more than 20%. More specifically, the comprehensive effect of the composite permeation enhancement agent of ZS-3 is the best among the three, and the permeability reaches $9.06 \times 10^{-3}$ $\mu m^2$. Simultaneously, the cement stone has a certain early strength for consolidation of loose formation to meet the requirements of use.

What is claimed is:

1. An oil well cement composite permeation enhancement agent for a hydrate layer, wherein, in parts by weight, a composition of raw materials of the oil well cement composite permeation enhancement agent is 4.6 parts-5.0 parts of kerosene, 0.23 parts-0.25 parts of an emulsifier, 0.8 parts-1.1 parts of a surface-modified polypropylene fiber, 10.0 parts-12.0 parts of porous and permeable microspheres, 1.0 part-1.2 parts of paraffin, and 57.5 parts-62.5 parts of water;
wherein a length of the surface-modified polypropylene fiber is 5 mm-6 mm, a diameter of each of the porous and permeable microspheres is 0.27 mm-0.55 mm, and an aperture of each of the porous and permeable microspheres is 0.15 mm-0.25 mm;
a specific preparation process of the surface-modified polypropylene fiber is as follows: first, swelling a polypropylene fiber with a xylene for 60 min-80 min, then taking it out and filtering to dry to obtain a first resulting fiber; soaking the first resulting fiber in an acetone solution for 3 h-4 h, then washing with a distilled water and drying in an air to obtain a second resulting fiber; followed by soaking the second resulting fiber with a silane coupling agent with a concentration of 50% for 120 min to modify and optimize a surface of the polypropylene fiber to obtain a third resulting fiber; after a modification is completed, washing the third resulting fiber to be neutral with the distilled water and drying to obtain the surface-modified polypropylene fiber; finally, blowing the surface-modified polypropylene fiber into a root shape with an air gun and packing for a set aside.

2. The oil well cement composite permeation enhancement agent for a hydrate layer, wherein the kerosene is a colorless and transparent pure kerosene.

3. The oil well cement composite permeation enhancement agent for a hydrate layer according to claim 1, wherein the paraffin is a solid paraffin of C18-30.

4. A method for a preparation of the oil well cement composite permeation enhancement agent for the hydrate layer according to claim 1, comprising specific steps of:
   (1) mixing the distilled water with the emulsifier and stirring well, then adding with the kerosene and stirring at a high speed to obtain an emulsion;
   (2) heating the paraffin to be a liquid paraffin and immersing hollow porous and permeable microspheres into the liquid paraffin, followed by placing in an open container;

placing the open container in a vacuum chamber, conducting a vacuuming under a negative pressure, wherein a temperature of the vacuum chamber is higher than a melting point of the paraffin; then, refrigerating the hollow porous and permeable microspheres until the liquid paraffin becomes a solid paraffin; wherein the paraffin is stored in a center of the hollow porous and permeable microspheres in a solid form, and paraffin-bearing microspheres are obtained;

(3) adding the surface-modified polypropylene fiber into the emulsion and adding the paraffin-bearing microspheres while stirring to obtain the oil well cement composite permeation enhancement agent.

5. The method for the preparation of the oil well cement composite permeation enhancement agent for the hydrate layer according to claim 4, wherein a mass fraction of the kerosene in the emulsion is 8%.

6. The method for the preparation of the oil well cement composite permeation enhancement agent for the hydrate layer according to claim 4, wherein the kerosene is a colorless and transparent pure kerosene.

7. The method for the preparation of the oil well cement composite permeation enhancement agent for the hydrate layer according to claim 4, wherein the paraffin is a solid paraffin of C18-30.

* * * * *